United States Patent [19]
Ebnesajjad et al.

[11] Patent Number: 5,683,639
[45] Date of Patent: Nov. 4, 1997

[54] SHORTENED SINTERING CYCLE FOR MOLDED POLYTETRAFLUOROETHYLENE ARTICLES

[75] Inventors: Sina Ebnesajjad, Chadds Ford, Pa.; Thomas Joseph Manista, Wilmington, Del.

[73] Assignee: E. I. Du Pont de Nemours and Company, Wilmington, Del.

[21] Appl. No.: 725,584

[22] Filed: Oct. 3, 1996

[51] Int. Cl.$^6$ ............................................. B29C 35/02
[52] U.S. Cl. ............................................. 264/127
[58] Field of Search ................................. 264/127

[56] References Cited

U.S. PATENT DOCUMENTS

| | | | |
|---|---|---|---|
| 3,819,594 | 6/1974 | Holmes et al. | 260/87.5 A |
| 4,055,615 | 10/1977 | Ikeda | 264/105 |
| 4,997,608 | 3/1991 | Haldeman et al. | 264/120 |
| 5,429,782 | 7/1995 | Masutani et al. | 264/127 |

*Primary Examiner*—Mary Lynn Theisen

[57] ABSTRACT

Sintering oven utilization is increased by completing the sintering cycle for a molded article of granular polytetrafluoroethylene outside of the oven inside an insulation shell.

6 Claims, 1 Drawing Sheet

SHORTENED SINTERING CYCLE FOR MOLDED POLYTETRAFLUOROETHYLENE ARTICLES

FIELD OF INVENTION

This invention is in the field of processes for converting polytetrafluoroethylene resin into sintered articles.

BACKGROUND OF INVENTION

Tetrafluoroethylene (TFE) polymers are well known. The group of TFE polymers includes polytetrafluoroethylene (PTFE), and copolymers of TFE with small concentrations of copolymerizable modifying monomers and having sufficiently high melt viscosity (MV) that the resins remain non-melt-fabricable (modified PTFE). The modifying monomer can be, for example, hexafluoropropylene (HFP), perfluoro(propyl vinyl ether) (PPVE), chlorotrifluoroethylene (CTFE), or other monomer that introduces bulky side groups into the molecule. The concentration of such modifiers is usually less than 0.5 wt %.

Two general processes for polymerizing TFE to make PTFE (or modified PTFE) are well known, each leading to polymer with distinctly different properties. The dispersion process for polymerizing TFE yields an aqueous dispersion of PTFE particles having typical average diameter of about 200 nm. PTFE dispersion particles ordinarily have a characteristic property of fibrillating under shear stress. The dispersion product of polymerization may be concentrated and/or stabilized and used as an aqueous dispersion, or may be coagulated and dried to obtain a PTFE resin that is variously called coagulated dispersion resin or fine powder. Articles are usually fabricated from fine powder by a lubricated extrusion (paste extrusion) process at a temperature near room temperature, utilizing the fibrillatable character of the dispersion particle, followed by removal of the lubricant and then by fusing (sintering) of the PTFE. PTFE and modified PTFE can also be produced by the process known as suspension polymerization. The suspension process for polymerizing TFE, usually involving vigorous agitation of the aqueous medium, yields non-fibrillatable solid particles that typically are irregular, fibrous, and coarse. The raw PTFE resin is commonly subjected to various finishing operations such as cutting, or cutting and pelletizing, to obtain resins with desired processing characteristics. PTFE resins derived from suspension polymerization of TFE, commonly called granular PTFE, are typically fabricated into finished articles by compacting at room temperature and then sintering, optionally followed by machining, i.e., by techniques adapted from powder metallurgy.

Granular resins, whether PTFE or modified PTFE, have high melt viscosity, e.g. a melt viscosity of at least $1 \times 10^8$ Pa·s. Such resins do not flow readily at melt temperature and, therefore, are considered to be non-melt-fabricable.

As indicated above, articles are made from granular PTFE resin in a two-stage process. In the first stage, a preform is made by compression molding of the resin in the appropriate shape at a temperature well below the melting point, typically at ambient temperature. In the second stage, the preform from step one is fused, usually in a forced-air convection oven, in a process that is called sintering even though the resin is heated to temperature above the crystalline melting temperature of the resin. The sintering stage reduces and/or eliminates the void space by coalescence of the molten PTFE particles. A typical sintering cycle consists of programmed heat-up, hold, and programmed cool-down steps. Various standardized sintering procedures are described, for example, in ASTM Standard D-4894. Presently, these steps take place entirely in the sintering oven and are quite time consuming. The total sintering cycle can last from several hours up to one week, depending on the size of the article. Larger articles require longer cycles. The length of sintering cycle is dictated by the extremely low thermal conductivity of PTFE, e.g., 1600 times lower than copper, which necessitates slow heat-up and cool-down of the article. A controlled slow cool-down of the article is critical to the proper crystallization of the PTFE from the molten state to allow development of acceptable, and acceptably uniform, mechanical properties such as tensile strength and flex life as well as to prevent deformation and/or cracking of thick sections.

The sintering cycles practiced in the present state of the art provide acceptable product for commercial use. However, a major drawback of the lengthy PTFE sintering cycle is low productivity, or, alternatively, the need to invest in additional oven capacity. Improved utilization of sintering ovens by shortening the cycle has been a long-standing desire of the industry to improve the the economics of PTFE part fabrication.

SUMMARY OF THE INVENTION

This invention provides a process for sintering an article molded under pressure from granular polytetrafluoroethylene, comprising (a) heating said article in an oven to a temperature above the melting point of said polytetrafluoroethylene to sinter said article, (b) cooling said oven to a temperature no higher than 320° C., (c) removing said article from said oven when said temperature is no more than 320° C., and (d) completing said cooling outside of said oven and without chilling said article so as to avoid deformation of said article during said completion of cooling.

DETAILED DESCRIPTION

Figure 1:
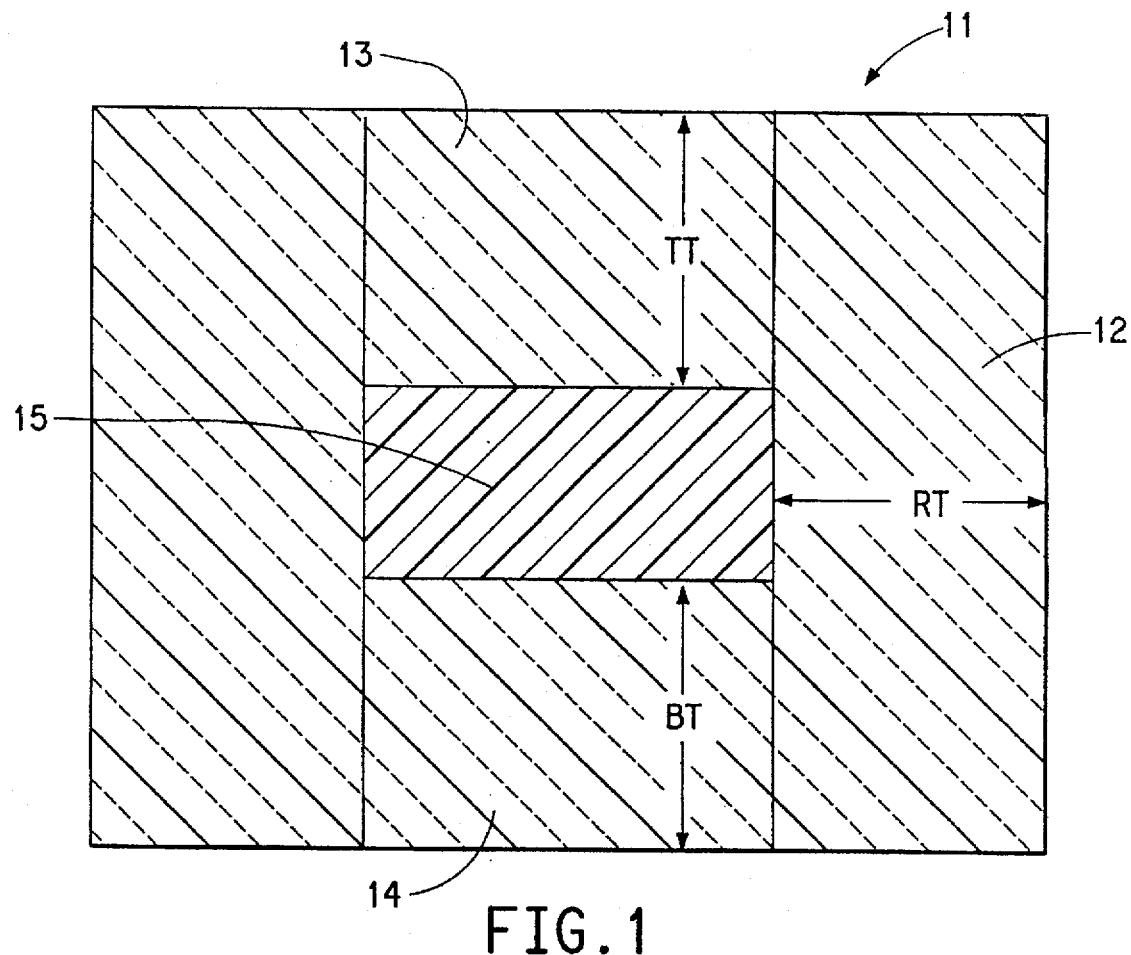
FIG. 1. Axial cross-section of an insulation shell for a cylindrical billet.

This invention provides a process for carrying out the cooling segment of the sintering cycle for polytetrafluoroethylene outside the oven, while obtaining properties which are equal to or, surprisingly, better than those obtained by the standard process. The modification of the cooling segment results in a sintering process whereby the total time in the sintering oven can be reduced by 20–35%, depending on the details of the cycle. In the new process, the article is removed from the oven during oven cool-down but while the article is still very hot. The article is then cooled further outside the oven without chilling the surface of the article. This can be accomplished by placing the hot article in a thermal insulation shell, and allowing the article to cool to room temperature. This procedure allows a rapid cool-down of the oven for utilization in a new sintering cycle. Furthermore, the properties of articles fabricated using the new process were found to be equal to or better than the properties of similar articles made using the traditional sintering cycles utilized by the industry.

PTFE resin for which the sintering process of this invention can be used is produced by the suspension polymerization process. As discussed above, such resin is commonly known as granular PTFE. The resin can be in any physical form suitable for conversion to articles by compaction and sintering. As such, the resin is non-melt-fabricable, generally having melt viscosity of at least $1\times10^8$ Pa·s as determined at 380° C. by the tensile creep method disclosed in U.S. Pat. No. 3,819,594. The resin can be homopolymer PTFE, or PTFE modified with up to 0.5 wt % of modifying monomer that introduces bulky side groups into the polymer, such as, for example, at least one perfluoro(alkyl vinyl ether) wherein the alkyl group contains 1–5 carbon atoms. Hereafter, "PTFE" is understood to encompass both homopolymer and modified PTFE. Such PTFE resin usually has a melting point of at least 322° C., more commonly at least 327° C. PTFE resins that can be employed in the sintering process of this invention include those described in ASTM Standard Specification D-4894.

Molded articles to be subjected to the sintering process of this invention can be prepared from PTFE by any suitable means known in the art. Generally, articles are prepared as a preform by compaction under pressure in a mold, or by isostatic molding using flexible bladders. Preforming temperature is commonly near room temperature. Pressures in the range of $1$–$10\times10^3$ psig (7–70 MPa) are typically used. For large articles, it is often prudent to apply pressure in a controlled manner to avoid cracking the preform. See, for example, the discussion in the brochure "Compression Molding" (DuPont Company, 1995). The resulting preform normally has sufficient green strength to be easily transferred to the sintering oven. While the Examples below illustrate the process of this invention using articles having simple shapes, one skilled in the art will recognize that other shapes can be subjected to the process, including regular shapes having holes, such as cylindrical billets having axial holes, and even irregular shapes.

The sintering process of this invention can be divided into two segments. The first segment is carried out in an oven ("the oven segment"). The second segment is carried out outside of the oven.

The oven segment of the sintering process can be carried out according to any program that would be suitable for the PTFE article to be sintered if the sintering were to be carried out entirely in the oven. Typically, this includes heating at a controlled rate from the temperature at which the green preform is introduced into the oven, usually room temperature, to a temperature higher than the melting temperature of the PTFE such as to a temperature of at least 335° C. or 350° C., a dwell time with the oven temperature held at the high temperature, followed by cooling at controlled rate. One skilled in the art will recognize the possibility of numerous variations in the oven segment of the process, such as multiple heating or cooling rates, or hold periods in the heating or cooling programs during which oven temperature is not changed. The oven segment of the sintering process of this invention ends after the oven is cooled to a temperature below the crystallization temperature of the PTFE used, at which point the hot article is removed from the oven. The temperature at which the oven segment ends is no higher than 320° C., preferably no higher than 295° C. There is no particular lower temperature by which the oven segment must end. However, the benefit of the process of this invention diminishes with decreasing temperature for the end of the oven segment. Preferably, the oven segment is ended at a temperature of at least 220° C., more preferably at least 240° C. After the hot article is removed from the oven, the oven can be returned to the starting temperature for another cycle more quickly than if programmed cool-down were completed in the oven.

In the second segment of the sintering cycle of this invention, the environment for the PTFE article outside of the oven is controlled so that cooling of the article takes place without gross deformation or cracking of the article, and so that the crystallinity that develops, and hence the physical characteristics that are determined by the level of crystallinity, are acceptably uniform at acceptable values throughout the article. The amount of deformation that is acceptable is to some degree a function of the melt viscosity (MV) of the PTFE, since gravitational sag can occur for large articles molded from resin having MV at the low end of the range for granular PTFE. Generally, however, when MV is at least $1\times10^{10}$ Pa·s, measured values of diameter should be within ±1.5%, preferably within ±1%, of the mean value for a cylindrical billet that was compacted into a true circular cylinder at room temperature using good commercial practice. The uniformity of crystallinity of such billets can be assessed by measuring the specific gravity (SG) of the PTFE article at least at five selected locations throughout the article. Preferably, the standard deviation of SG is no more than 0.01 SG units. Any means for so controlling the cooling can be used.

A convenient means for controlling the cooling is to employ a shell of thermal insulation around the hot article. The insulation material should have adequate heat resistance to withstand the temperature of the article at the end of the oven segment. Such insulation materials include, for example, glass fiber, mineral fiber, polyaramide fiber, ceramic fiber, and the like. Glass fiber is a preferred insulation material because of its ready availability and low cost. The thermal insulation can have any structure that is suitable for the PTFE article to be cooled. Glass fiber insulation, for example, is available in various forms, e.g., semi-rigid blocks, which are convenient structures from which to cut cavities to desired shape, as well as batts and other structures.

The insulating value of the insulation used in the sintering process of this invention should be sufficiently high to provide the desired control of cooling rate and prevent chilling the sintered article, but not so high, of course, that no cooling occurs, and preferably not so high that cooling is too slow and degradation as indicated by discoloration of the PTFE occurs. That is, the thermal insulation should be effective to control cooling at the desired rate. For example, for an insulation shell made from Type II Thermal Insulation Wool (Owens-Corning Fiberglas Corp.), a shell thickness in the range 3–10 inch (7.6–25.4 cm), preferably 3–5 inch (7.6–12.7 cm) is satisfactory. Insulation materials are often characterized by a thermal resistance (R) value, the reciprocal of the thermal conductance. R typically characterizes the resistance to heat flow for a 1-inch thickness of the insulation, and the insulating value of a different thickness of insulation can be obtained by multiplying R by the thickness. For example, Type II Thermal Insulation Wool has a nominal R=4.5 (°F.·hr·ft$^2$/BTU·inch), so a 3-inch thickness has R=13.5 (3×4.5). Compression of the insulation material under the weight of a PTFE article will affect the insulating value, but original (initial) thicknesses as recited above have been satisfactory. Thus, insulation shells having R values as-fabricated in the range of about 10–45, preferably 13–25, can be used.

Transfer of the PTFE article from the oven at the end of the oven segment to the controlled environment outside of the oven for completion of the sintering process of this invention should be carried out as quickly as possible to avoid shocking (chilling) the article, causing deformation and/or cracking, and to avoid unacceptable variation in crystallinity. Desirably, for example, this transfer is carried out in 5–15 sec.

EXAMPLES

A finely divided PTFE resin satisfying ASTM D-4894, Type II (Teflon® TFE fluoropolymer resin grade 7A, DuPont Company) and having a melting point of about 342° C. was used in all of the following tests, either as natural resin or as the base for filled compounds.

Cylindrical billets of various sizes were formed (molded) by compaction at room temperature under various pressures as given in the Examples and Controls to follow. Generally, pressure was applied by a ram advancing at the rate of about 10 inch/min (25 cm/min), and the maximum pressure of 5000 psi (3.4 MPa) was held for about 3 min (dwell time).

Sintering was carried out using various complete sintering cyles (Controls), or parts of cycles as points of departure for the Examples of the invention. Sintering cycles used in whole or in part were those of Procedures D and F of ASTM D-4894, and a modified cycle described herein as Procedure M. For convenience, the sintering cycles used are summarized in Table 1, wherein heating and cooling times are stated rather than heating and cooling rates as in ASTM D-4894. In all cases, the cycles started at room temperature (23° C). For a heating or a cooling step, the time (t) shown is the time taken to change temperature from the previous temperature to the indicated temperature (T).

When thermal insulation was used in departures from the sintering schedules of Table 1, the insulation was made of glass fiber. Unless otherwise specified, insulation shells were made from Type II Thermal Insulation Wool (Owens-Corning Fiberglas Corp.) obtained in large 2.5-inch (6.4-cm) thick sheets having a density of 2.4 lb/ft$^3$ (35.5 kg/m$^3$) and an R value of 4.5 (°F·hr·ft$^2$/BTU·inch), and were fabricated as follows. With reference to FIG. 1, circular pieces of desired diameter were cut from the sheet, and axial holes having the diameter of the PTFE billet 15 to be sintered were cut in the circular pieces. These pieces were stacked to desired height to form the wall 12 having radial thickness RT of insulation shell 11. Circular pieces having the diameter of the axial hole in the pieces forming the wall were stacked to desired height to form the top 13 and bottom 14 of the shell having top thickness TT and bottom thickness BT, respectively. For simplicity, the shell 11, top 13, and bottom 14 are shown in unitary thicknesses (height).

Figure 2:
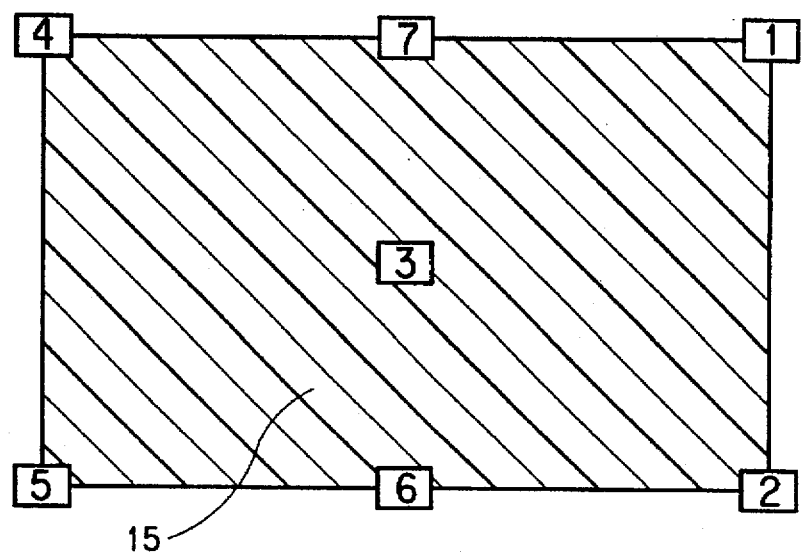
FIG. 2. Axial cross-section of a cylindrical billet, with numerical key to sample sites for specific gravity measurement.

A sintered billet was characterized in terms of the specific gravity of specimens taken at various locations on or near an axial cross-section of the billet. The key to specimen location is shown in FIG. 2. Specimen sites 1, 4 & 7 were at the top of the billet 15, while 2, 5 & 6 were at the bottom. Specimens from the cross-section corner and edge sites included the surface of the billet.

Specific gravity (SG) measurements were made in water at 23° C., following the procedure of ASTM D-4894.

Crystallinity (X) was calculated from measured SG using the relationship X=762.25−1524.5/density, wherein density=0.9977SG (Polymer Handbook, 2nd Edition, J. Wiley & Sons). Small differences in SG reflect larger differences in crystallinity, which is significant in determining the properties of sintered PTFE.

Tensile strength and elongation at break were measured according to ASTM D-4894. Flexural modulus was measured according to ASTM D-790. Impact strength (notched Izod) was measured according to ASTM D-256.

TABLE 1

Sintering Cycle Summary

| | Sintering Procedure | | | | | |
|---|---|---|---|---|---|---|
| | D | | F | | M | |
| Step | T(°C.) | t(hr) | T(°C.) | t(hr) | T(°C.) | t(hr) |
| Start | 23 | 0 | 23 | 0 | 23 | 0 |
| Heat | 238 | 3.6 | 290 | 2.0 | 335 | 6.0 |
| Hold | — | — | — | — | 335 | 3.6 |
| Heat | 371 | 2.2 | 380 | 0.75 | 375 | 2.0 |
| Hold | 371 | 4.0 | 380 | 6.0 | 375 | 3.6 |
| Cool | 238 | 2.2 | 294 | 1.4 | 295 | 2.0 |
| Hold | 238 | 0.1 | 294 | 0.4 | — | — |
| Cool | 23 | 6.0 | 23 | 7.3 | 23 | 6.0 |

Control A

A billet having 3-inch (7.6-cm) diameter and 1.5-inch (3.8-cm) height was made at a preform pressure of 5000 psig (34.6 MPa). It was sintered according to Procedure D (Table 1). Specific gravity (SG) of the billet was measured at various of the points identified in FIG. 2. Results are listed in Table 2.

Control B

A billet similar to that of Control A was made. It was sintered according to Procedure D to the end of the cool-down to 238° C. It was then removed from the oven and allowed to cool on the shop floor at 23° C. When cool, the billet was grossly deformed and not useful commercially, showing the importance of the final cool-down step of the sintering cycle.

Example 1

A billet similar to that of Control A was made. It was sintered according to Procedure D through the cool-down to 238° C. When the temperature reached 238° C., the billet was removed from the oven and immediately placed in an insulation shell on the shop floor until cooled to room temperature. The shell had the configuration as generally described above and shown in FIG. 1, but was fabricated from 0.5-inch (1.3-cm) thick Type II Thermal Insulation Wool and the wall section of the shell was formed by spirally winding a strip of the insulation stock into a tubular shape having a 3-inch diameter hole to accommodate the billet. The insulation thickness was 5 inch (12.7 cm) in the radial direction and 3 inch (7.6 cm) on the top and bottom of the billet. When cool, the billet was found to have retained its shape, i.e., was not deformed. SG and X results are summarized in Table 2. Comparison with the results of Control A shows that the process of this invention achieves sintered billet characteristics equivalent to those obtained with the standard sintering cycle.

TABLE 2

SG and Crystallinity for Example 1 and Control A

| Property | Cont. A | Ex. 1 |
|---|---|---|
| SG: | | |
| Site 1 | 2.145 | 2.155 |
| Site 2 | 2.165 | 2.155 |

TABLE 2-continued

SG and Crystallinity for Example 1 and Control A

| Property | Cont. A | Ex. 1 |
|---|---|---|
| Site 3 | 2.155 | 2.155 |
| Site 4 | 2.155 | 2.145 |
| Site 5 | 2.155 | 2.155 |
| Average | 2.155 | 2.153 |
| X (%): | | |
| Average | 53.2 | 52.5 |

Control C

The general procedure of Control A was essentially followed for a 5-inch (12.7-cm) diameter by 2.5-inch (6.4-cm) height billet, but using Procedure M for sintering. SG and X are summarized in Table 3, and physical property data are given in Table 4.

Example 2

A billet similar to that of Control C was made. It was sintered according to Procedure M up to the end the cool-down to 295° C. When the temperature reached 295° C., the billet was removed from the oven and placed in an insulation shell made as generally described above and having 5 inch (12.7 cm) thickness in the radial direction and 5 inch thickness on the top and bottom of the billet. The transfer from oven to shell was made in 5–15 sec. SG and X results are summarized in Table 3, physical property data in Table 4. Billet properties were comparable to those of Control C, showing that the process of this invention yields sintered billets having characteristics equivalent to those obtained with programmed oven cool-down.

Example 3

The procedure of Example 2 was essentially repeated, except that the insulation shell had 10-inch (25-cm) thickness in the radial direction and 5-inch (12.7-cm) thickness on the top and bottom of the billet. SG and X results are summarized in Table 3, physical property data in Table 4. These data show that the sintering process of this invention can be used to obtain sintered PTFE having properties better than those yielded by the standard sintering process carried out entirely in an oven, while freeing the oven for another charge of PTFE preforms much sooner than if the standard oven cycle were completed.

TABLE 3

SG and Crystallinity for Examples 2–3 and Control C

| Property | Cont. C | Ex. 2 | Ex. 3 |
|---|---|---|---|
| SG: | | | |
| Site 1 | 2.151 | 2.154 | 2.164 |
| Site 2 | 2.150 | 2.157 | 2.161 |
| Site 3 | 2.158 | 2.147 | 2.174 |
| Site 4 | 2.151 | 2.168 | 2.155 |
| Site 5 | 2.159 | 2.162 | 2.164 |
| Site 6 | 2.157 | 2.158 | 2.169 |
| Site 7 | 2.157 | 2.166 | 2.162 |
| Average | 2.155 | 2.159 | 2.164 |
| X (%): | | | |
| Average | 53.2 | 54.5 | 56.1 |

TABLE 4

Physical Properties Summary

| Property | Cont. C | Ex. 2 | Ex. 3 |
|---|---|---|---|
| Tensile strength (psi) | 4479 | 4731 | 4907 |
| Elongation (%) | 371 | 369 | 386 |
| Flex modulus ($10^3$ psi) | 76.0 | 76.9 | 78.3 |
| Notched Izod (ft-lb/in) | 3.52 | 4.20 | 4.13 |

Controls D–E

Control A was essentially repeated except that billets were removed from the oven at the end of the hold period at 371° C. In Control D, the hot billet was placed directly in the 23° C. air. In Control E, the hot billet was placed in the insulation shell of Example 1 and allowed to cool down on the shop floor in 23° C. air. Both billets were deformed after cooling and had an hourglass appearance. The deformation of the billet in Control E was appreciably less severe than that of Control D. However, both parts were commercially useless because of the deformation, illustrating the importance, even in the process of this invention, of partial cool-down in the sintering oven, as least to the crystallization point of the PTFE resin used.

Control F

The general procedure of Control A was essentially followed for a 7-inch (17.8-cm) diameter by 3.5-inch (8.9-cm) height billet, but using a preform pressure of 2500 psig (17.3 MPa) and using Procedure F (Table 1) for sintering. SG and X are summarized in Table 5.

Examples 4–5

Two billets similar to that of Control F were made. They were sintered according to Procedure F up to the end of the cool-down to 294° C. The billets were removed from the oven and placed in insulation shells made as generally described above. For Example 4, the shell had 10-inch (25-cm) thickness in the radial direction and 5-inch (12.7-cm) thickness on the top and bottom of the billet. For Example 5, the shell had 5-inch thickness in the radial direction and 5-inch thickness on the top and bottom of the billet. SG and X are summarized in Table 5. Note that the billets of both Example 4 and 5 exhibited higher SG (higher crystallinity) than Control F, with Example 4 highest. However, the billet of Example 4, cooled in a shell with 10-inch radial insulation was discolored on the top surface, while the billet of Example 5 (5-inch radial insulation) was completely white. The discoloration (degradation) for Example 4 was confined to a thin surface layer, 1–2 mm or less thick. These examples indicate there is an optimal amount of insulation for the best results. Thus, these examples show that the process of this invention can be used to obtain sintered PTFE having properties better than those yielded by the standard sintering process carried out entirely in an oven. They also show that superiority in one respect may be obtained at a sacrifice in another respect, e.g., as when the insulation is relatively thick as in Example 4.

TABLE 5

SG and Crystallinity for Examples 4-5 and Control F

| Property | Cont. F | Ex. 4 | Ex. 5 |
|---|---|---|---|
| SG: | | | |
| Site 1 | 2.145 | 2.206 | 2.165 |
| Site 2 | 2.141 | 2.151 | 2.160 |
| Site 3 | 2.152 | 2.154 | 2.161 |
| Site 4 | 2.147 | 2.203 | 2.160 |
| Site 5 | 2.151 | 2.146 | 2.160 |
| Site 6 | 2.149 | 2.155 | 2.160 |
| Site 7 | 2.148 | 2.159 | 2.161 |
| Average | 2.148 | 2.168 | 2.162 |
| X (%): | | | |
| Average | 50.9 | 57.4 | 55.5 |

Example 6 and Control G

Two sets of billets, similar to those of Control A, were made from a series of common compounds of PTFE (PTFE Compounds Corp.) as identified in Table 6. Filler concentrations are given in wt % based on combined weights of PTFE and total filler. For Control G, one set of billets was sintered according to Procedure D, as in Control A. For Example 6, one set of billets was sintered according to Procedure D up to the end of the cool-down to 238° C., as in Example 1. Each billet was then removed from the oven and placed, in 5-15 sec, in an insulation shell having 5 inch (12.7 cm) thickness in the radial direction and 5 inch thickness on the top and bottom of the billet until room temperature was reached. All billets were free from deformation, cracks, and discoloration. For both sets of billets, SG was measured at locations 1, 4 and 7 (FIG. 2). Average SG results are shown in Table 6. Results show that the sintering process of this invention can be used for PTFE articles containing fillers, achieving SG values that are comparable to or slightly greater than those obtained by oven cooling.

TABLE 8

Compounds and SG for Example 6 & Control G

| | Specific Gravity | |
|---|---|---|
| Compound | Ex. 6 | Cont. G |
| 10% graphite | 2.148 | 2.149 |
| 60% bronze | 2.718 | 2.717 |
| 15% milled E glass + 5% MoS$_2$ | 2.242 | 2.243 |
| 15% milled E glass | 2.210 | 2.206 |
| 25% milled E glass | 2.210 | 2.206 |
| 35% milled E glass | 2.206 | 2.200 |

What is claimed is:

1. A process for sintering an article molded under pressure from granular polytetrafluoroethylene, comprising (a) heating said article in an oven to a temperature above the melting point of said polytetrafluoroethylene to sinter said article, (b) cooling said oven to a temperature no higher than 320° C., (c) removing said article from said oven when said temperature is no more than 320° C., and (d) completing the cooling of said article outside of said oven and without chilling said article so as to avoid deformation of said article during said completion of cooling.

2. The process of claim 1, wherein the completion of cooling of said article without chilling is done by enveloping said article in an insulation shell which is effective to prevent said deformation of said article.

3. The process of claim 1, wherein the temperature in Step (b) is no higher than 295° C.

4. The process of claim 1, wherein the temperature in Step (b) is at least 220° C.

5. The process of claim 2, wherein said insulation shell has thermal resistance R of from about 10 to about 45.

6. The process of claim 2, wherein said insulation shell comprises at least one insulation sheet having a portion removed which is in the shape and size of said article and a top and bottom formed from said removed portion for enclosing said article within said sheet.

\* \* \* \* \*